US009538892B2

(12) United States Patent
Fong et al.

(10) Patent No.: US 9,538,892 B2
(45) Date of Patent: Jan. 10, 2017

(54) ROBOT MANAGEMENT SYSTEMS FOR DETERMINING DOCKING STATION POSE INCLUDING MOBILE ROBOTS AND METHODS USING SAME

(71) Applicant: iRobot Corporation, Bedford, MA (US)

(72) Inventors: Philip Fong, South Pasadena, CA (US); Jason Meltzer, Los Angeles, CA (US); Steffen Gutmann, Cupertino, CA (US); Vazgen Karapetyan, Pasadena, CA (US); Mario E. Munich, La Canada, CA (US)

(73) Assignee: iRobot Corporation, Bedford, MA (US)

( * ) Notice: Subject to any disclaimer, the term of this patent is extended or adjusted under 35 U.S.C. 154(b) by 37 days.

(21) Appl. No.: 14/046,941

(22) Filed: Oct. 5, 2013

(65) Prior Publication Data

US 2014/0100693 A1    Apr. 10, 2014

Related U.S. Application Data

(60) Provisional application No. 61/710,422, filed on Oct. 5, 2012.

(51) Int. Cl.
*A47L 9/28* (2006.01)
*G05D 1/02* (2006.01)
(Continued)

(52) U.S. Cl.
CPC ............... *A47L 9/2873* (2013.01); *A47L 9/30* (2013.01); *B25J 5/00* (2013.01); *B25J 9/1664* (2013.01);
(Continued)

(58) Field of Classification Search
CPC ........................... G05D 1/0225; G05D 1/0234
See application file for complete search history.

(56) References Cited

U.S. PATENT DOCUMENTS 4,777,416 A * 10/1988 George, II ........... G05D 1/0225
                                                    318/568.12
5,995,214 A * 11/1999 Bruckstein ............. G01B 11/26
                                                    340/955
(Continued)

FOREIGN PATENT DOCUMENTS

EP        1760564 A2     3/2007
KR    20100136904 A    12/2010
KR    20120047137 A     5/2012

OTHER PUBLICATIONS

Notification of Transmittal of the International Search Report and the Written Opinion of the International Searching Authority, or the Declaration, in corresponding PCT Application No. PCT/US2013/063599 mailed Jan. 16, 2014 (12 pages).

(Continued)

*Primary Examiner* — Nicholas Kiswanto
(74) *Attorney, Agent, or Firm* — Myers Bigel, P.A.

(57) ABSTRACT

A mobile robot system is provided that includes a docking station having at least two pose-defining fiducial markers. The pose-defining fiducial markers have a predetermined spatial relationship with respect to one another and/or to a reference point on the docking station such that a docking path to the base station can be determined from one or more observations of the at least two pose-defining fiducial markers. A mobile robot in the system includes a pose sensor assembly. A controller is located on the chassis and is configured to analyze an output signal from the pose sensor assembly. The controller is configured to determine a dock- (Continued)

ing station pose, to locate the docking station pose on a map of a surface traversed by the mobile robot and to path plan a docking trajectory.

20 Claims, 13 Drawing Sheets

(51) Int. Cl.
*A47L 9/30* (2006.01)
*B25J 5/00* (2006.01)
*B25J 9/16* (2006.01)
*B25J 11/00* (2006.01)
*B25J 13/00* (2006.01)
*B25J 19/00* (2006.01)
*H02J 7/00* (2006.01)

(52) U.S. Cl.
CPC ............ *B25J 9/1666* (2013.01); *B25J 9/1697* (2013.01); *B25J 11/0085* (2013.01); *B25J 13/006* (2013.01); *B25J 19/005* (2013.01); *G05D 1/0225* (2013.01); *G05D 1/0234* (2013.01); *G05D 1/0274* (2013.01); *H02J 7/0045* (2013.01); *A47L 2201/02* (2013.01); *G05D 2201/0215* (2013.01); *Y10S 901/01* (2013.01)

(56) References Cited

U.S. PATENT DOCUMENTS

| | | | |
|---|---|---|---|
| 6,362,875 B1 * | 3/2002 | Burkley | G01S 5/163 356/139.03 |
| 6,629,028 B2 | 9/2003 | Paromtchik et al. | |
| 6,764,373 B1 | 7/2004 | Osawa et al. | |
| 7,441,298 B2 * | 10/2008 | Svendsen | A47L 5/30 15/319 |
| 7,501,780 B2 * | 3/2009 | Yamamoto | G05D 1/0225 318/568.12 |
| 8,255,084 B2 * | 8/2012 | Lee | B25J 5/00 318/568.16 |
| 8,896,660 B2 * | 11/2014 | Aliaga | G05D 1/0234 348/36 |
| 2004/0012362 A1 | 1/2004 | Tsurumi | |
| 2004/0158357 A1 | 8/2004 | Lee et al. | |
| 2007/0021869 A1 | 1/2007 | Baek et al. | |
| 2007/0233319 A1 * | 10/2007 | Im | G05D 1/0225 700/245 |
| 2007/0234492 A1 | 10/2007 | Svendsen et al. | |
| 2007/0244610 A1 * | 10/2007 | Ozick | A47L 5/30 701/23 |
| 2008/0174268 A1 | 7/2008 | Koo | |
| 2014/0100693 A1 | 4/2014 | Fong | |
| 2016/0091899 A1 | 3/2016 | Aldred et al. | |

OTHER PUBLICATIONS

Extended European Search Report for EP Application No. 13844141 mailed Jun. 29, 2016, 8 pages.
Motard, Elvina et al., "Incremental On-Line Topological Map for a Visual Homing Application," Proceedings 2007 IEEE International Conference on Robotics and Automations, pp. 2049-2054, 2007.

* cited by examiner

ROBOT MANAGEMENT SYSTEMS FOR DETERMINING DOCKING STATION POSE INCLUDING MOBILE ROBOTS AND METHODS USING SAME

RELATED APPLICATIONS

This application claims priority to U.S. Provisional Application Ser. No. 61/710,422, filed Oct. 5, 2012, the contents of which are hereby incorporated by reference in its entirety.

BACKGROUND

One highly desirable characteristic of household mobile robots is the capability of performing self-charging whenever the battery level reaches a low enough value. Many mobile robots currently in the market have systems for finding the docking station and engaging with charging contacts. Some robots, like the Roomba® from iRobot®, the RC-3000 from Kärcher®, or the Hausen™ from Samsung®, use IR beams on the station and IR receptors on the robot to detect the charging station and navigate until docked.

SUMMARY

In some embodiments, and according to the invention, a mobile robot system is provided that includes a docking station having at least two pose-defining fiducial markers. The pose-defining fiducial markers have a predetermined spatial relationship with respect to one another and/or to a reference point on the docking station such that a docking path to the base station can be determined from one or more observations of the at least two pose-defining fiducial markers. A mobile robot in the system has a chassis, a motorized drive connected to the chassis for moving the mobile robot to a docked position, and a pose sensor assembly having a sensor that is configured to output a signal in response to the at least two pose-defining fiducial marks in a pose sensor field of view. A controller is located on the chassis and is configured to analyze the output signal from the pose sensor assembly. The controller has the predetermined spatial relationship of the pose-defining fiducial marker stored in a controller memory. The controller is configured to determine a docking station pose that is based on the spatial relationship of the pose-defining fiducial markers and the signals from the pose sensor assembly. The controller is further configured to locate the docking station pose on a map of a surface traversed by the mobile robot and to path plan a docking trajectory including a curve having a terminal portion aligned with a docking lane of the docking station, based on a current robot position on the map of the surface and the docking station pose and to provide instructions to the motorized drive to move the mobile robot along the curve of the docking trajectory and into a docking lane aligned with the docking station.

DRAWINGS

Figure 1:
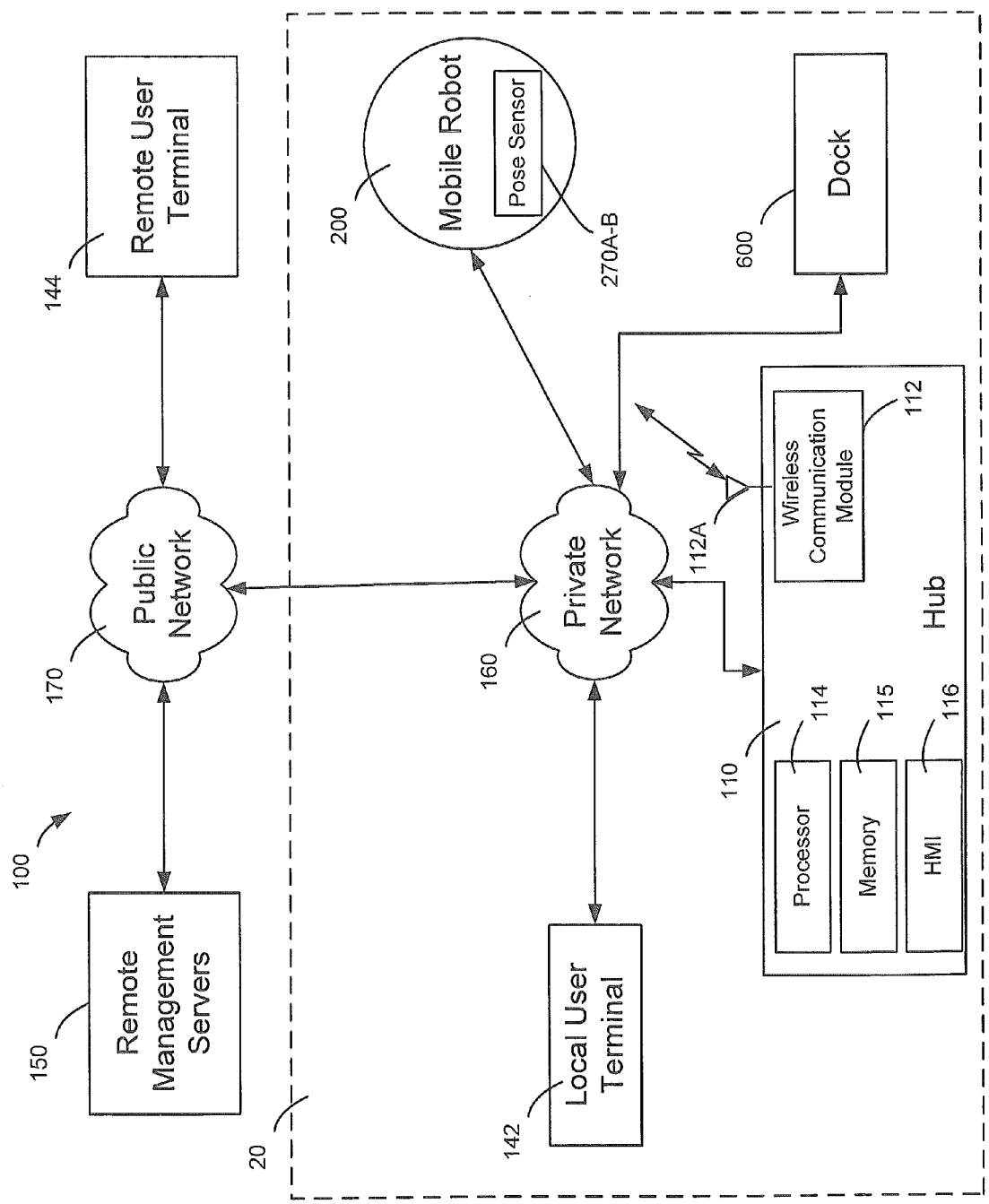
FIG. 1 is a schematic diagram of a robot management system according to some embodiments, or according to the invention.
Figure 4A:
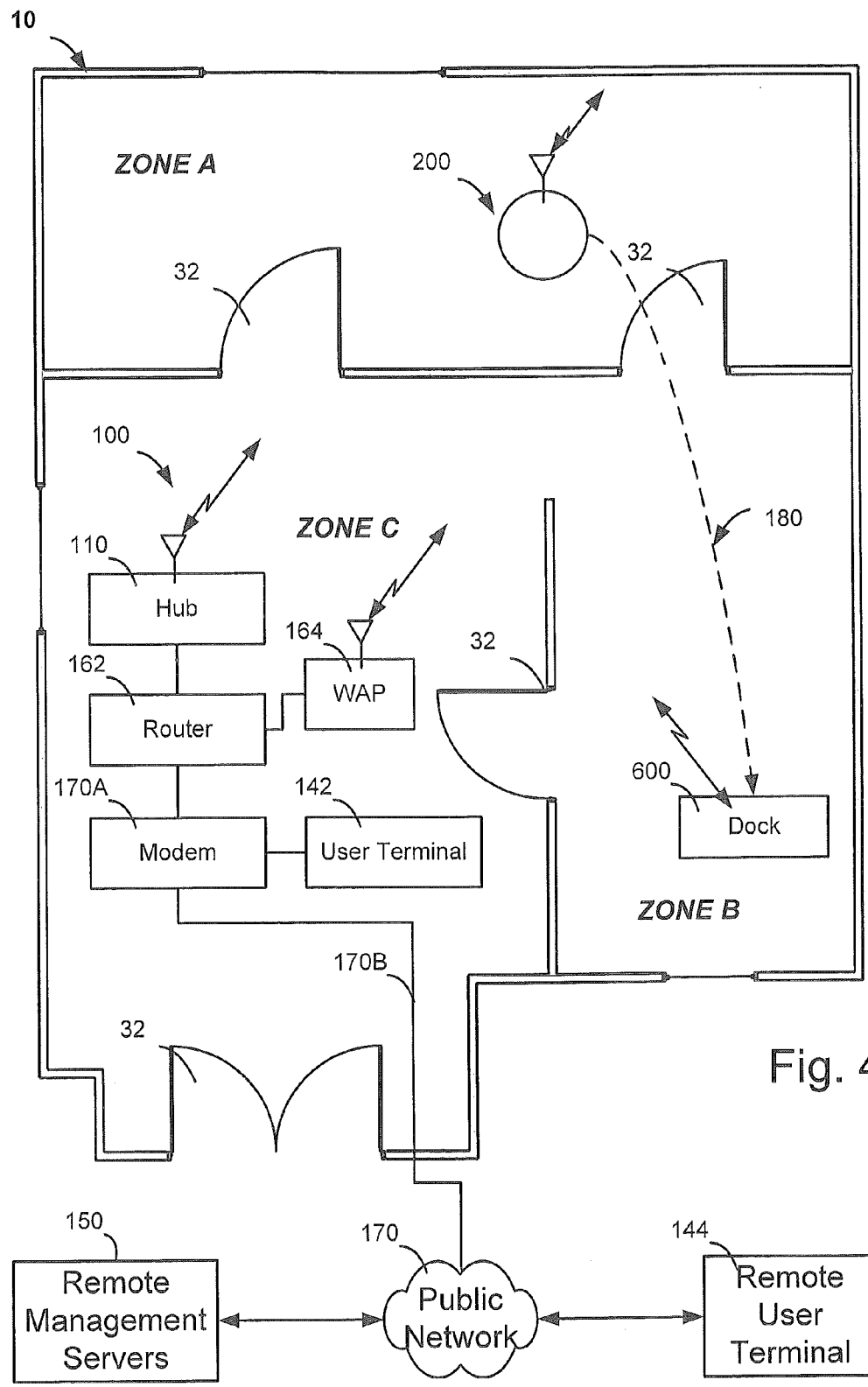
Figure 4B:
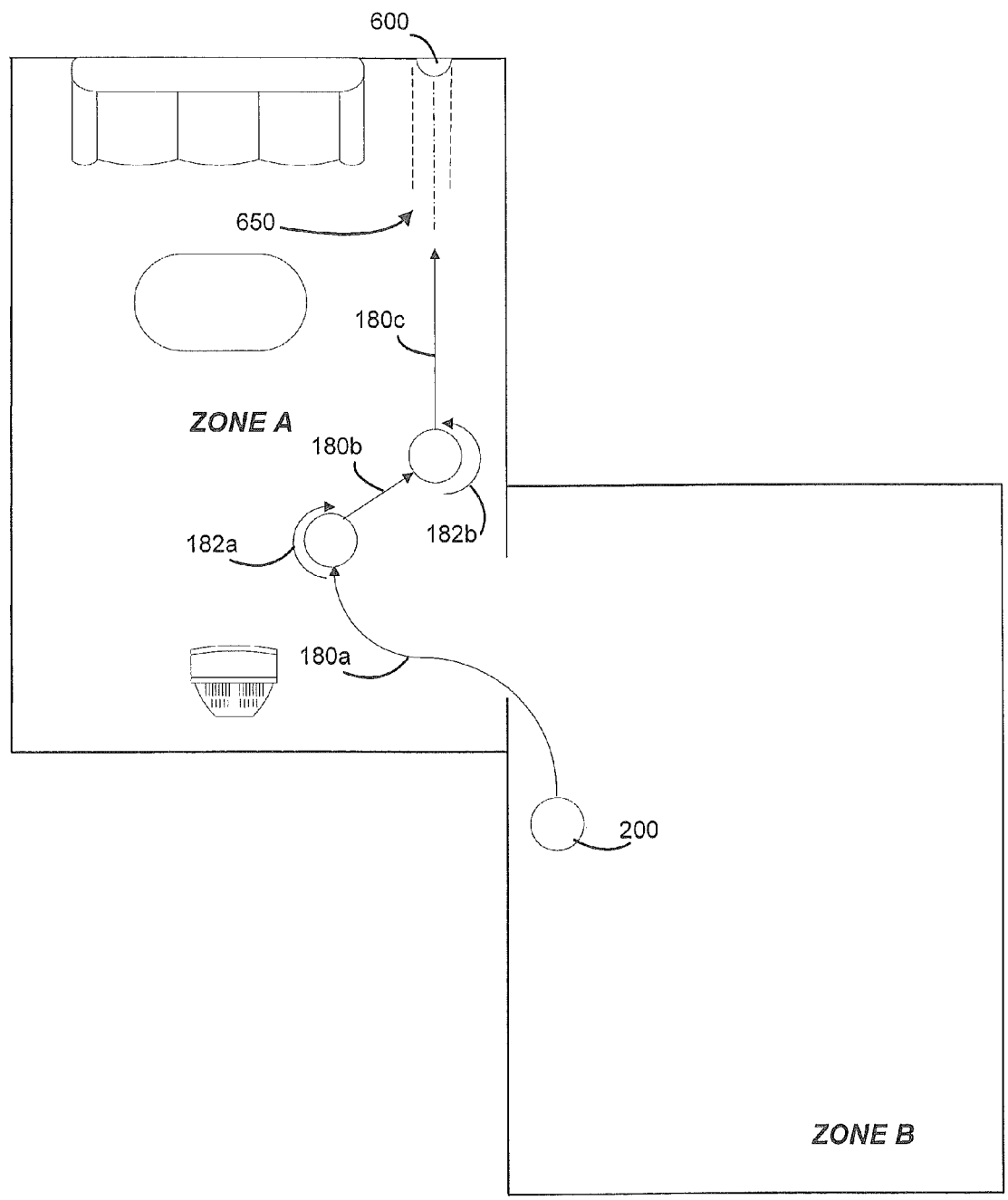
Figure 4C:
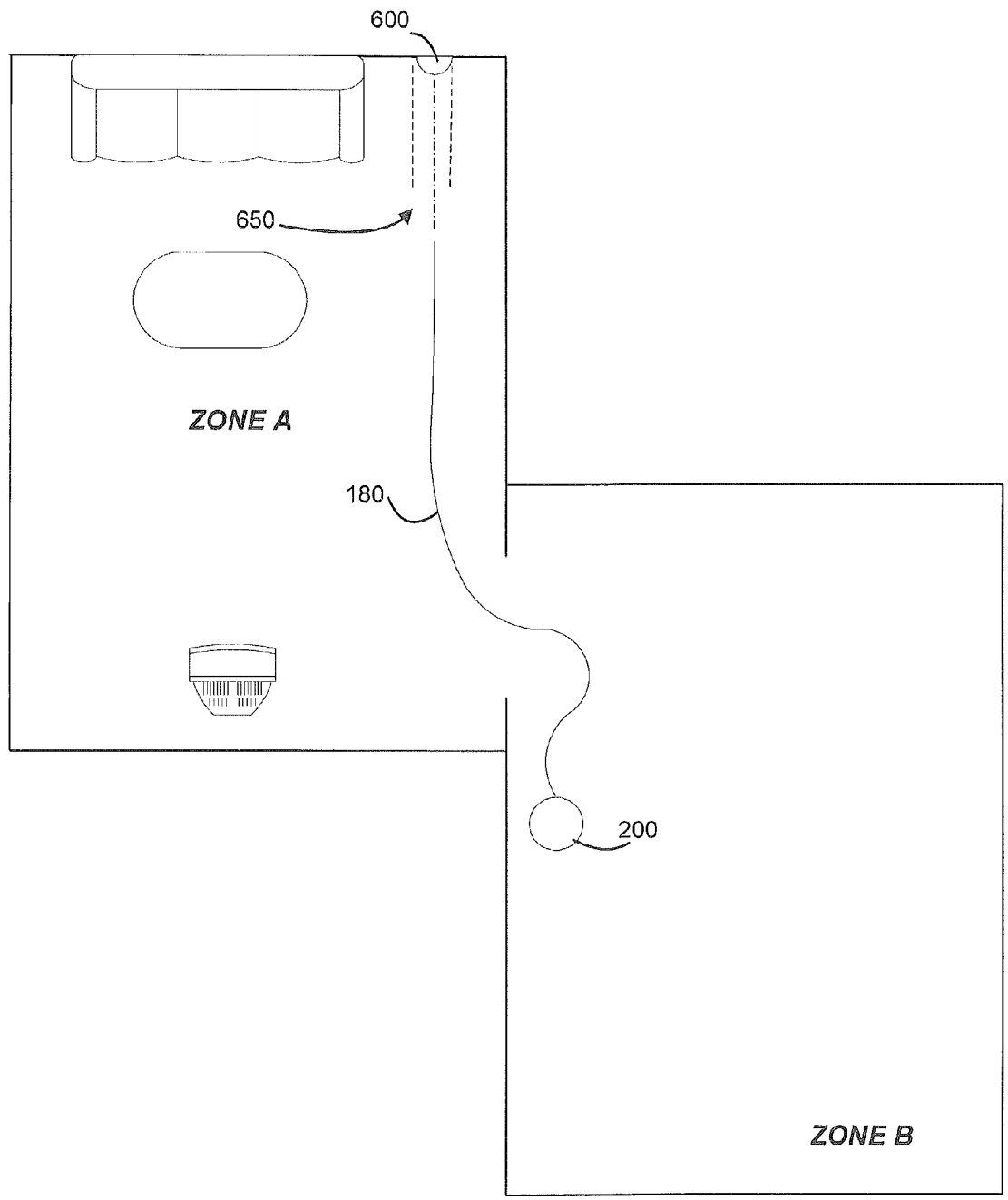

FIGS. 4A-C are a schematic diagrams of a structure including the robot management system of FIG. 1.

Figure 4D:
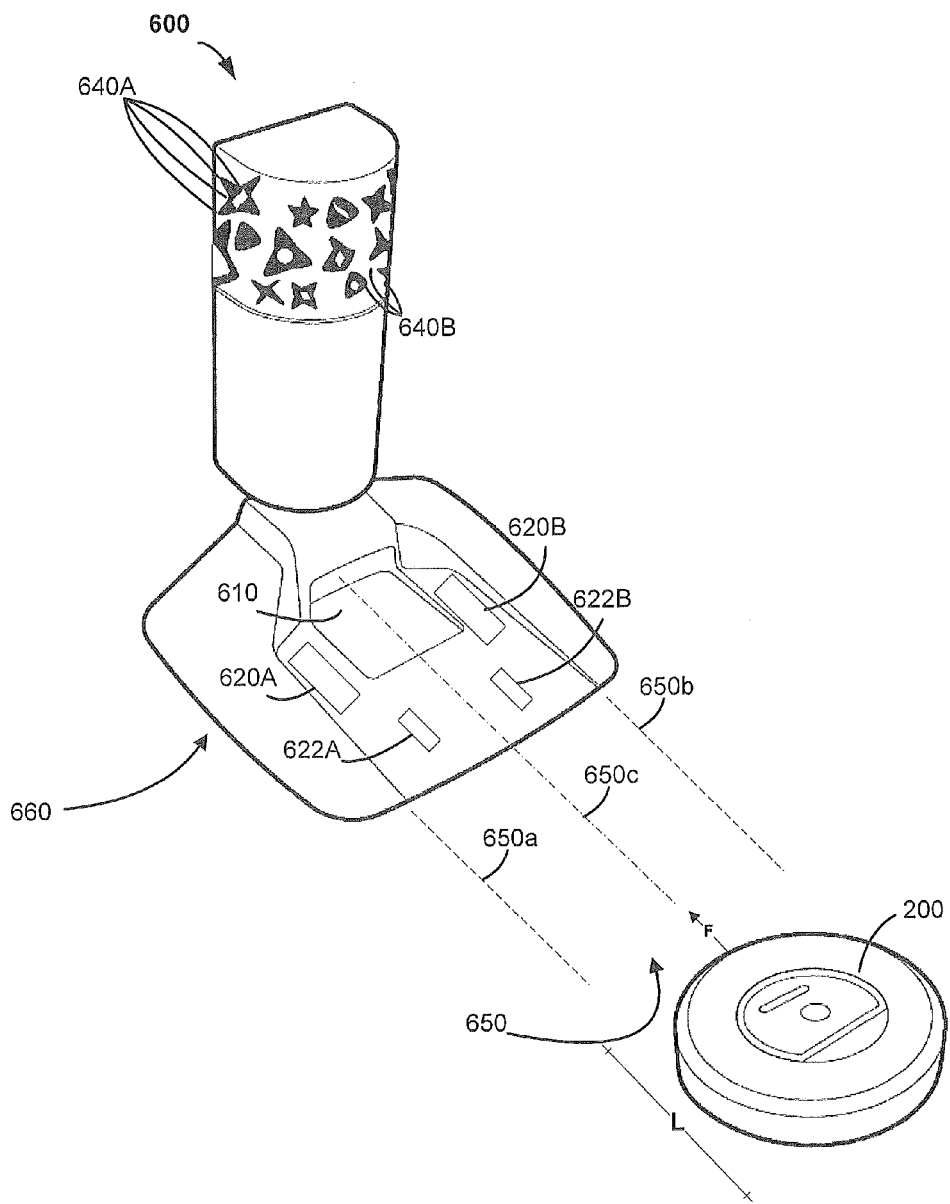
Figure 4E:
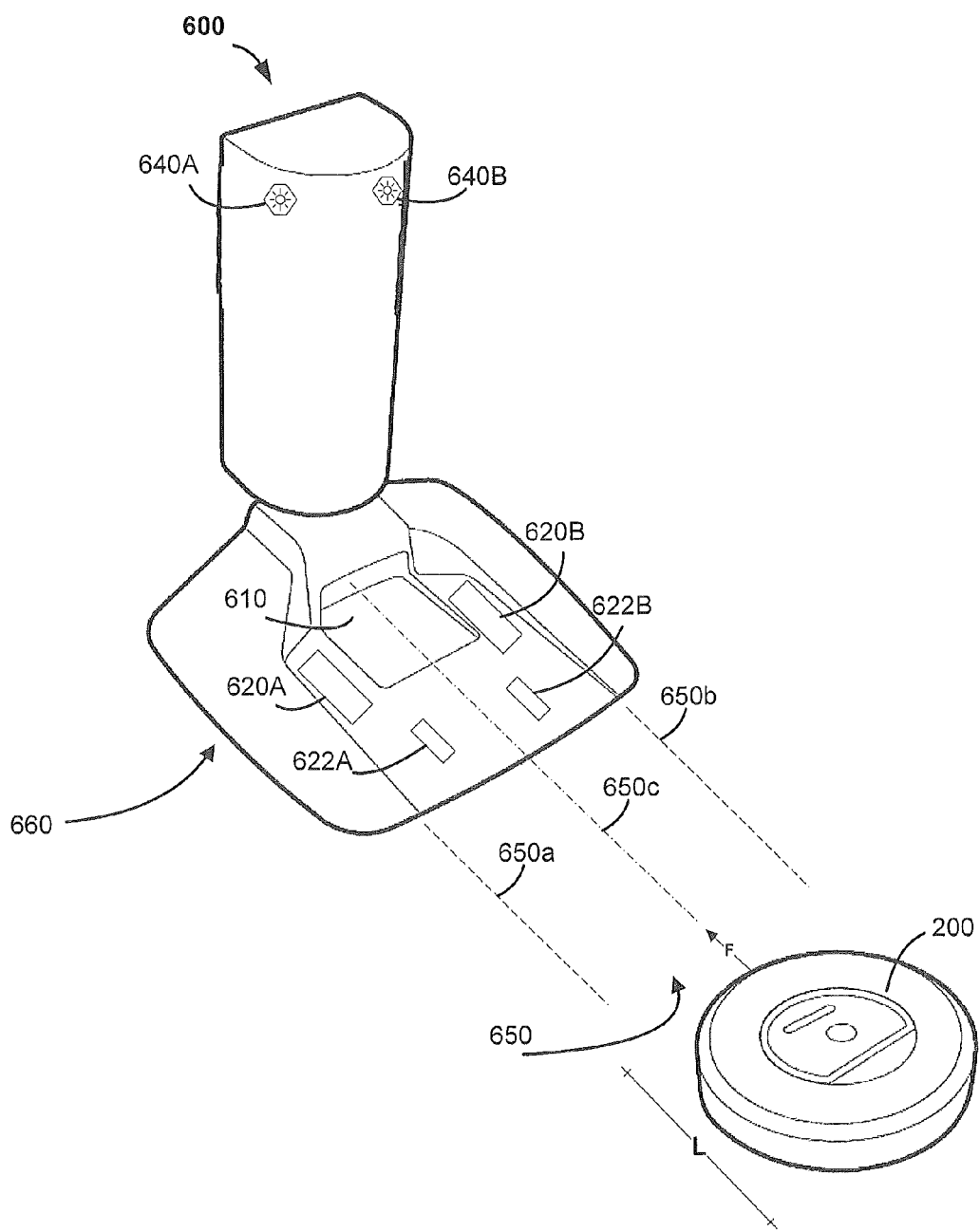

FIGS. 4D-E are a embodiments of a portion of the schematic diagrams of FIGS. 4A-C.

Figure 2:
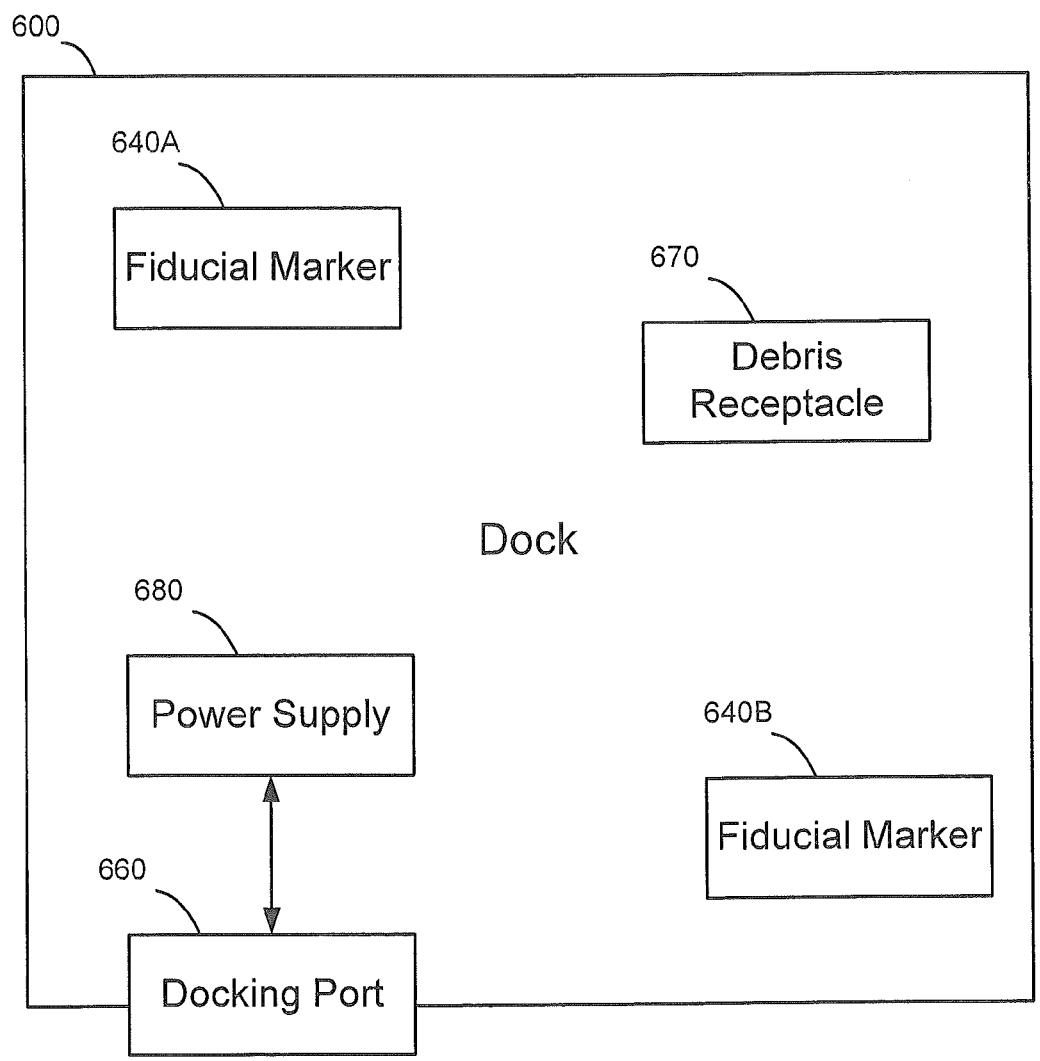
FIG. 2 is a schematic diagram of a dock according to some embodiments, or according to the invention.
Figure 3:
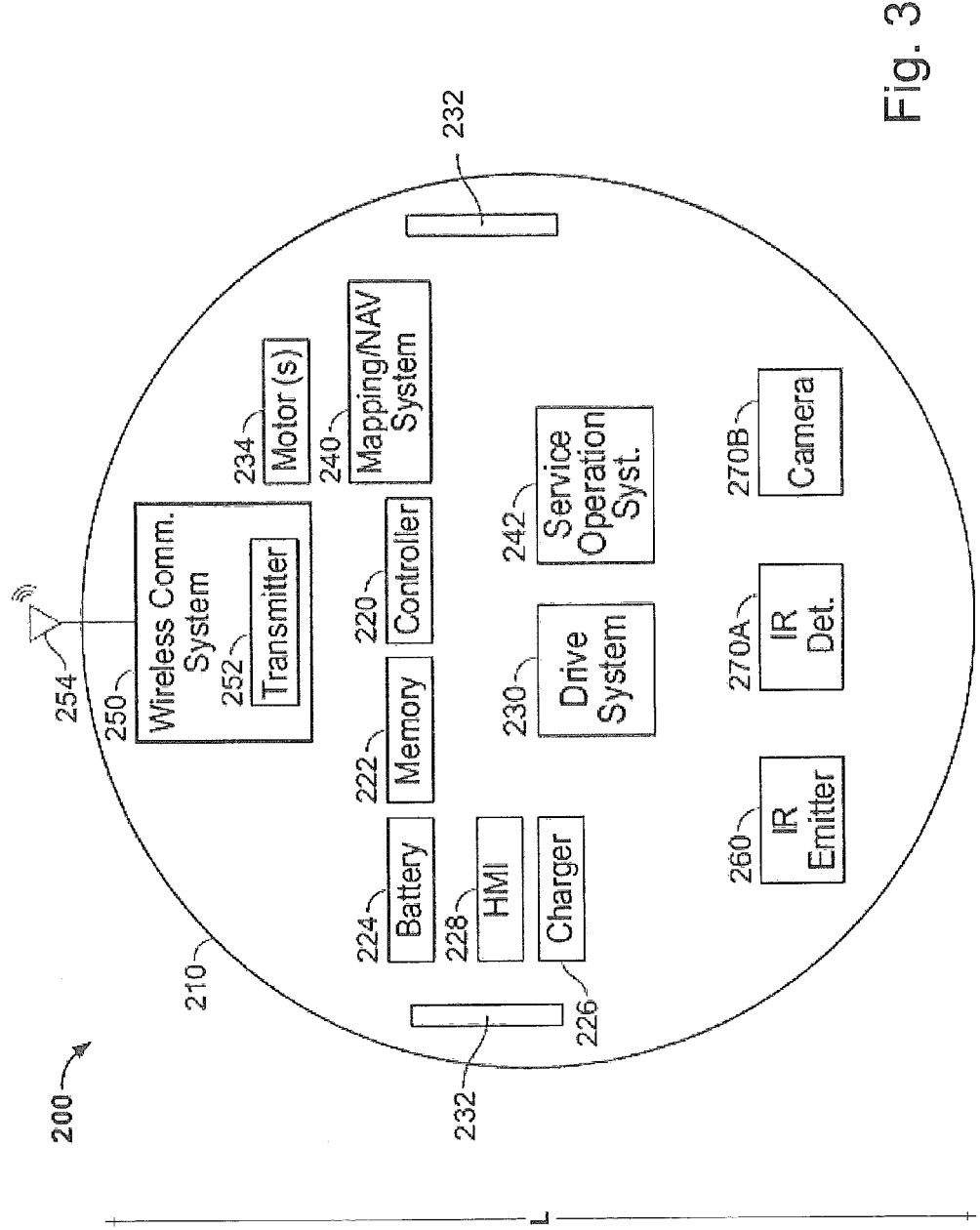
FIG. 3 is a schematic diagram of a robot according to some embodiments, or according to the invention.
Figure 5:
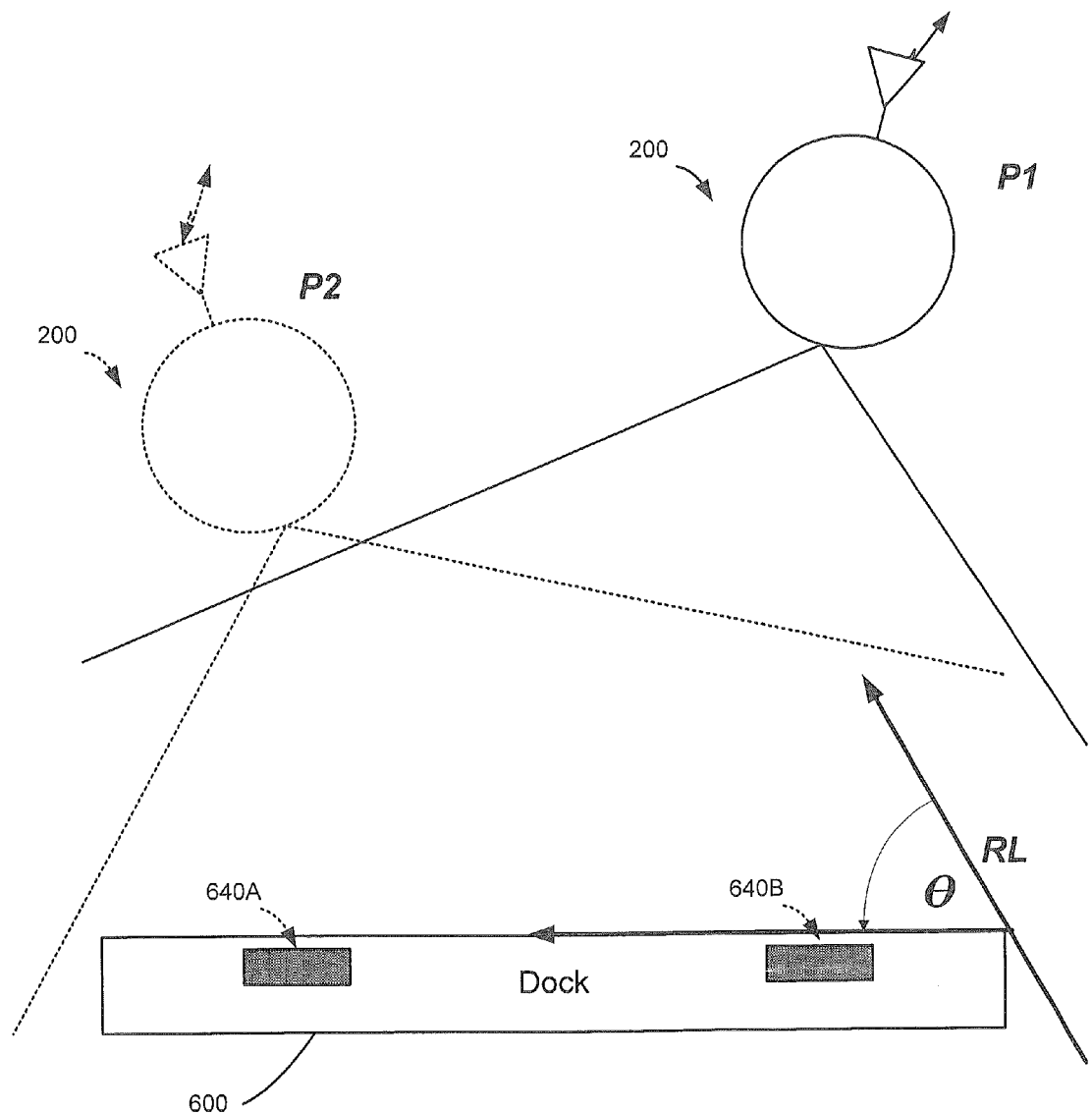

FIG. 5 is a schematic diagram of the dock of FIG. 2 and the robot of FIG. 3 according to some embodiments, or according to the invention.

Figure 6:
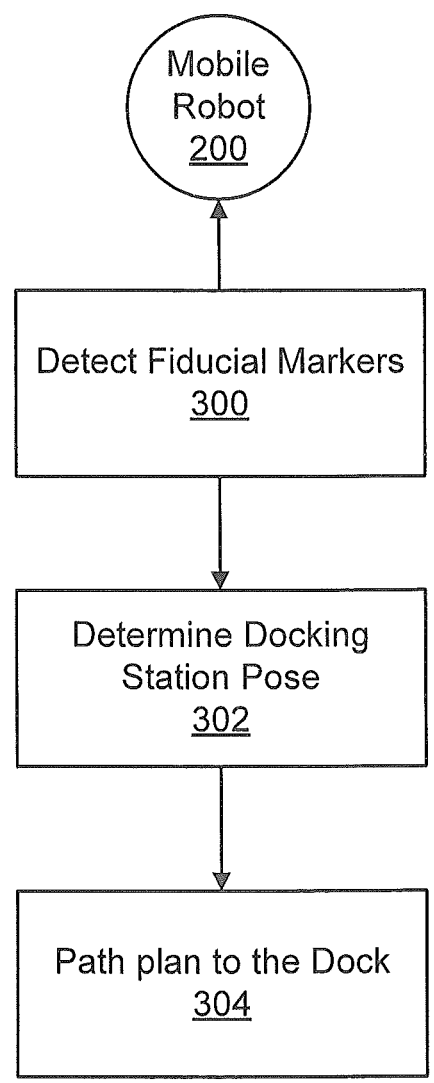

FIG. 6 is a flowchart illustrating operations according to some embodiments, or according to the invention.

Figure 7:
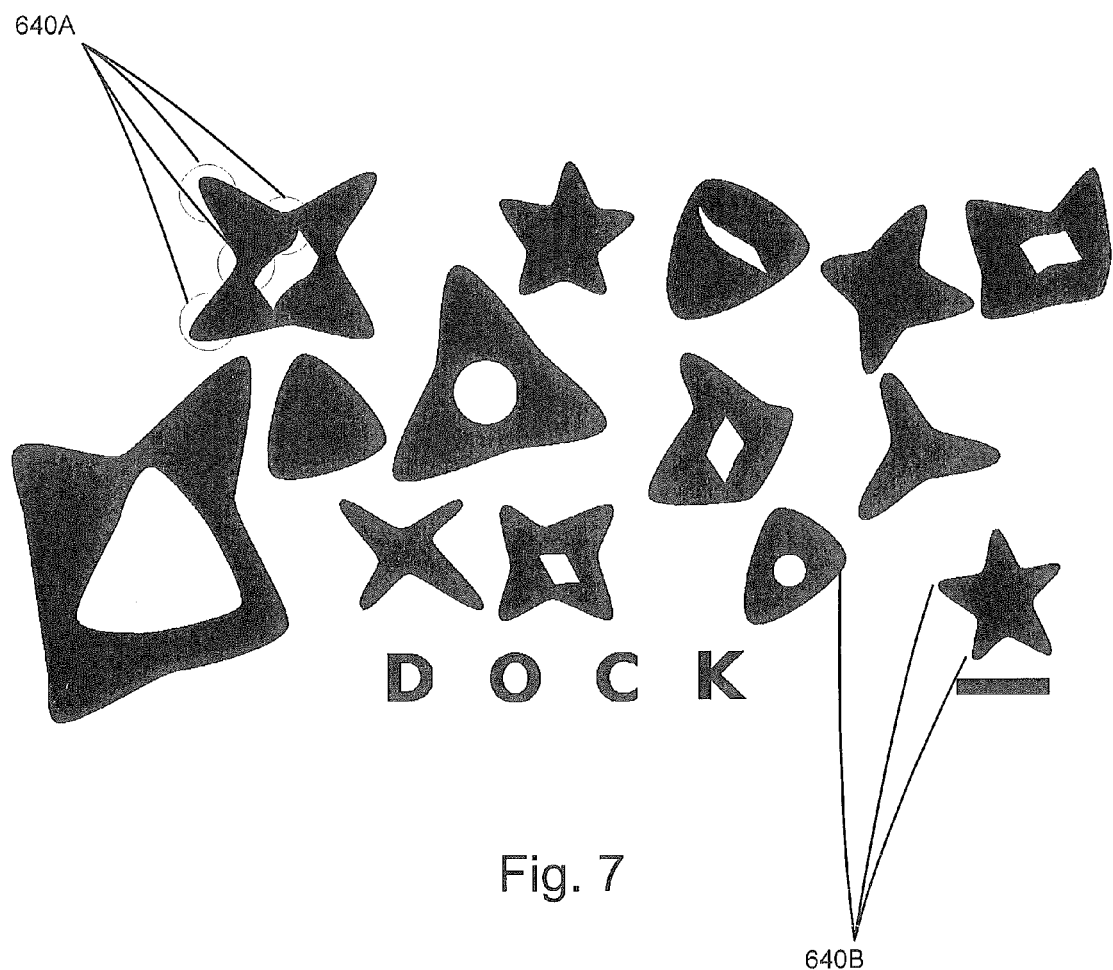

FIG. 7 is a schematic diagram of a fiducial marker according to some embodiments, or according to the invention.

Figure 8:
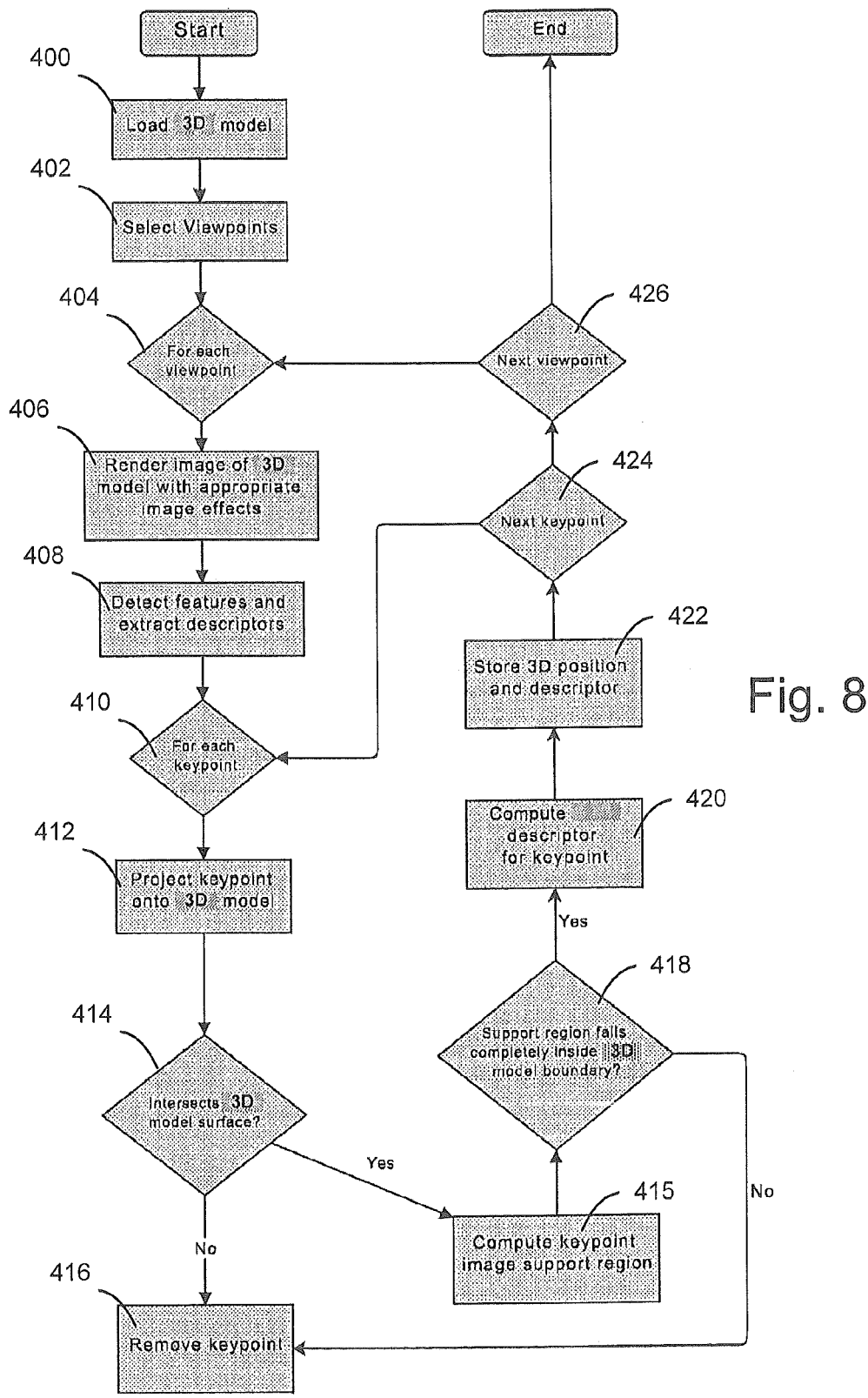
Figure 9:
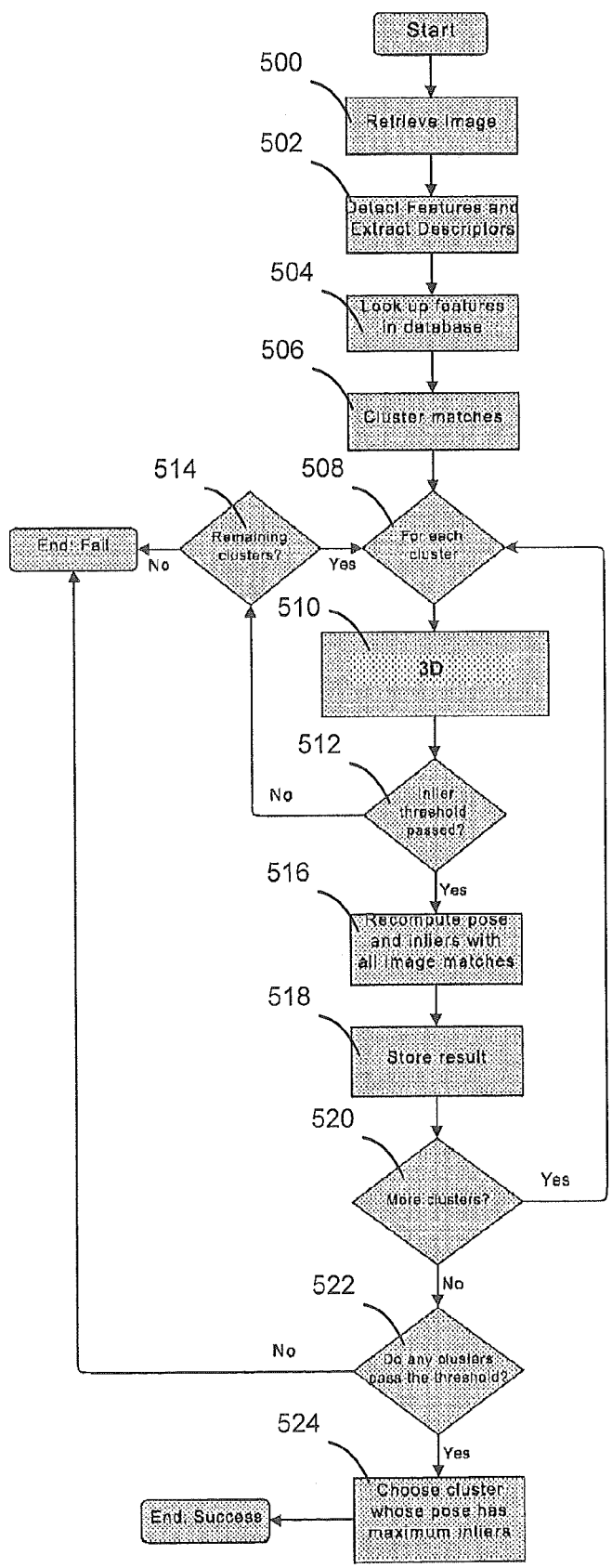

FIGS. 8-9 are flowcharts illustrating operations according to some embodiments, or according to the invention.

DESCRIPTION

The present invention now will be described hereinafter with reference to the accompanying drawings and examples, in which embodiments of the invention are shown. The present invention is described below with reference to block diagrams and/or flowchart illustrations of methods, apparatus (systems) and/or computer program products according to embodiments of the invention, or according to the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

Accordingly, the present invention may be embodied in hardware and/or in software (including firmware, resident software, micro-code, etc.). Furthermore, embodiments of the present invention, or the invention, may take the form of a computer program product on a computer-usable or computer-readable non-transient storage medium having computer-usable or computer-readable program code embodied in the medium for use by or in connection with an instruction execution system.

The computer-usable or computer-readable medium may be, for example but not limited to, an electronic, optical, electromagnetic, infrared, or semiconductor system, apparatus, or device. More specific examples (a non-exhaustive list) of the computer-readable medium would include the following: a portable computer diskette, a random access memory (RAM), a read-only memory (ROM), an erasable programmable read-only memory (EPROM or Flash memory) and a portable compact disc read-only memory (CD-ROM).

As used herein, a "pose" refers to information that can be used to define a position and orientation of an object. For example, the pose may include one to three angles of rotation of an object with respect to a reference angle and a location coordinate. The location coordinate may be a two- or three-dimensional location coordinate (e.g., (x, y) or (x, y, z).

As used herein, a "fiducial marker" includes any feature that may be identified by a sensor. At least two fiducial markers may be used to provide spatial information about an object, such as a docking station, and may include features at different positions that are connected to one another or separated from one another. A "pose" may be an X-Y coordinate pair in a frame of reference combined with a single angle of orientation. Non-limiting examples of fiducial markers include visual patterns, IR transmitting and IR blocking patterns, lights such as LEDs, photogrammetry targets or other patterns such as bar codes.

In some embodiments, or in the invention, a mobile robot system is provided that includes a docking station having at least two pose-defining fiducial markers. The pose-defining fiducial markers have a predetermined spatial relationship with respect to one another and/or to a reference point on the docking station such that a docking path to the base station can be determined from one or more observations of the at least two pose-defining fiducial markers. A mobile robot in the system has a chassis, a motorized drive connected to the chassis for moving the mobile robot to a docked position, and a pose sensor assembly having a sensor that is configured to output a signal in response to the at least two pose-defining fiducial marks in a pose sensor field of view. A controller is located on the chassis and is configured to analyze the output signal from the pose sensor assembly. The controller has the predetermined spatial relationship of the pose-defining fiducial marker stored in a controller memory. The controller is configured to determine a docking station pose that is based on the spatial relationship of the pose-defining fiducial markers and the signals from the pose sensor assembly. The controller is further configured to locate the docking station pose on a map of a surface traversed by the mobile robot and to path plan a docking trajectory including a curve or pathway having a terminal portion aligned with a docking lane of the docking station, based on a current robot position on the map of the surface and the docking station pose and to provide instructions to the motorized drive to move the mobile robot along the curve of the docking trajectory and into a docking lane aligned with the docking station.

With reference to FIGS. 1-4E, a robotic management system 100 according to embodiments of the invention, or according to the invention, is shown therein installed in an associated enclosure or living structure 10. The structure 10 may be a home or residential dwelling (e.g., a single family home, multi-family dwelling (e.g., a unit of a duplex, apartment, condominium, etc.), or mobile home) or a commercial living space (e.g., an office or studio). The structure 10 defines an enclosure space 20, which may be subdivided (physically, spatially and/or functionally) into two or more defined zones (e.g., zones A-C) and may include various features, such as doors 32.

The robotic management system 100 includes a network-enabled mobile robot 200, a network-enabled system hub 110, a robot dock 600, a private network (e.g., a broadband LAN) 160, and a remote management server or servers (e.g., cloud server) 150. As shown in FIG. 4A, the private network 160 is enabled by a router 162 and a broadband wireless access point (WAP) 164. The private network 160 is connected to the remote server 150 by a WAN or public network 170 (e.g., the Internet) through a gateway 170A (e.g., a broadband modem) and an external connection 170B (e.g., an ISP). The router 162, the WAP 164 and/or the modem 170A may be integrated in a single device. A local user terminal 142 (e.g., a PC, smartphone, or tablet computer) may be connected (wired or wirelessly) to the private network 160. A remote user terminal 144 may be connected to the remote server 150 and/or the private network 160 via the public network 170. The hub 110, the robot 200, the local user terminal 600 and the remote user terminal 144 may each be configured with downloadable or pre-installed application software enabling communications and control between the nodes 110, 200, 600, 142, 144 and 150 as described herein.

The hub 110 (FIG. 1) may be any suitable device configured to provide the functionality described herein. In some embodiments, or in the invention, the hub 110 includes a processor 114, memory 115, an HMI 116, a wireless communications module (e.g., a Wi-Fi module) 112, and an associated antenna 112A. The hub 110 may include connection hardware (e.g., an Ethernet connector) for wired connection to the router 162. As illustrated, the hub 110 can be connected to the private network 160 by wiring to the router 162. Alternatively, as shown in FIG. 4, the hub 110 may be wirelessly connected to the router 162 via the wireless module 112 and the WAP 164.

As shown in FIGS. 2, 4D and 4E, the robot dock 600 may include one or more distinct and distinguishable fiducial markers 640A, 640B. The robot dock 600 may include or be connected to a power supply 680 and include a docking port 660 having charging contacts 622A, 622B thereon that are operative to charge a battery of the mobile robot 200 when the robot 200 is docked at the robot dock 600. The dock 600 may be an evacuation station and may include a receptacle 670 to receive debris from the robot 200. In some embodiments, or in the invention, the dock 600 is connected (wired or wirelessly) to the private network 160 to enable or facilitate transmission of data from the robot 200 to the private network 160 and/or from the private network 160 to the robot 200.

As illustrated in FIGS. 4A-6, the fiducial markers 640A, 640B are configured to define a pose of the robot dock 600 (FIG. 6; Block 300). For example, the fiducial markers 640A, 640B may have a predetermined spatial relationship with respect to one another and/or to a reference on the docking station 600 and/or to a planar surface directly beneath the dock 600. As described herein, the fiducial markers 640A, 640B may be used by the pose sensor assembly 270A-270B of the mobile robot 200 in order to determine a pose of the docking station 600 (FIG. 6 (Block 302)) and/or to map out a docking path 180 (FIGS. 4A-4C; FIG. 6 (Block 304)). The docking path 180 may be used to provide instructions to the robot 200 to maneuver the robot 200 to the dock 600, for example, so that the robot 200 may connect with locks, clamps or detents 620A, 620B, or with electrical contacts 622A, 622B of the docking port 660 to charge a battery. The docking path 280 may be used to provide instructions that maneuver the robot 200 to align its air path with a docking lane or path such as an evacuation collar 610 on the dock 600 such that the dock moves debris from the robot 200 into the debris receptacle 670 of the dock 660. The evacuation collar 610 (or mating collar) is shown in FIGS. 4D and 4E as being positioned such that the robot 200 will be positioned above the evacuation collar, but the invention contemplates the robot 200 aligning with a mating collar 610 positioned above or beside the robot 200 as well. The fiducial markers 640A, 640B may be any feature that is configured to be used for pose detection. For example, the fiducial markers 640A, 640B may be a photogrammetry target, two or more lights such as LEDs, a spatially recognizable pattern, or a bar code.

The mobile robot 200 may be any suitable robot and it will be appreciated that not all of the components, features and functionality described herein are required in all embodiments of the invention. With reference to FIG. 3, the exemplary mobile robot 200 includes a chassis 210, a controller 220, memory 222, a battery 224, a battery charger 226, a human-machine interface (HMI) 228, a drive system 230, a mapping/navigation system 240, a service operation system 242, a wireless communication system 250, an IR emitter 260, and pose sensors 270A-B. The mobile robot 200 may be generally configured in the manner of or include features from the Roomba™ floor cleaning robot and/or robots as described in U.S. Pat. No. 7,024,278 and U.S. Published Application No. 2007/0250212, the disclosures of which are incorporated herein by reference, with suitable modifications.

The controller 220 may include any suitably configured processor (e.g., microprocessor) or processors. The controller 220 may be configured to control various components of the mobile robot 200. For example, the controller 220 may access and/or store information in the memory 222, control the data acquisition functions of the pose sensors 270A-B, provide instructions to the drive system 230, receive data and/or control a mapping function of the mapping/navigation system 240, communicate via the communication system 250 and/or HMI 228, monitor a charge of the battery 224 and the like.

The drive system 230 may include any suitable mechanism or system for actively and controllably transiting the robot 200 through the enclosure space 20. According to some embodiments, or in the invention, the drive system 230 includes a roller, rollers, track or tracks 232 and one or more onboard electric motors 234 operable by the controller 220 to convey the robot 200 across the floor of the enclosure space 20.

The service operation system 242 may be optional in some embodiments, or in the invention, and is operable to execute a service operation in the enclosure space 20. According to some embodiments, or in the invention, the service operation system 242 includes a floor cleaning system that cleans a floor surface of the enclosure space 20 as the robot 200 transits through the space 20. In some embodiments, or in the invention, the service operation system 242 includes a suction head and an onboard vacuum generator to vacuum clean the floor. In some embodiments, or in the invention, the system 242 includes a sweeping or mopping mechanism.

The wireless communication system 250 includes a wireless communication transmitter or module 252 (e.g., a Wi-Fi module) and an associated antenna 254 to enable wireless communication between the robot 200 and the hub 110 and/or the private network 160 (i.e., via the WAP 164). Various different network configurations may be employed for the private network 160, of which the mobile robot 200 constitutes a node. In some embodiments, or in the invention, the robot 200 communicates wirelessly with the hub 110 through the router 162 via the WAP 164. In some embodiments, or in the invention, the mobile robot 200 communicates with the remote management server 150 via the router 162 and the WAP 164, bypassing the hub 110.

In some embodiments, or in the invention, the robot 200 may communicate wirelessly directly with the hub 110 using narrowband or broadband (e.g., Wi-Fi) RF communication. For example, if the robot 200 is not equipped with a transmitter compatible with the WAP 164, the robot 200 may communicate with the hub 110, which may in turn relay data from the robot 200 to the private network 160 or the remote management server 150. In some embodiments, or in the invention, the system 100 includes a network bridge device that receives and converts RF signals from the robot 200 and relays them to the router 162 in a format supported by the router for delivery to the remote management server 150 or another device in the private network 160. In some embodiments, or in the invention, the system 100 includes a low power mesh data network employing a mesh topology wherein RF communications signals are relayed from node to node between the mobile robot 200 and the hub 110.

The exemplary robot 200 includes the following pose sensors: an IR radiation detector 270A and a camera 270B. These sensors are not exhaustive of the types of sensors that may be provided on the robot 200 and certain of the sensors may be omitted depending on the pose parameters to be detected by the robot 200.

The mapping/navigation system 240 can be used by the mobile robot 200 to map the enclosure space 20 and to determine or register the position of the robot 200 relative to the space 20 (i.e., to localize the robot 200 in the space 20). The robot 200 can thus also localize the locations of its onboard sensors 270A-B. Any suitable technique and components may be used to localize and register the robot 200, such as machine vision (e.g., using the camera 270B and Feature Recognition or Class Recognition software), light beacons, or radio frequency received signal strength indicator (RSSI) technology.

The system 100 can uniquely identify rooms (e.g. Zone A, Zone B, Zone C) by combining (1) identity information (e.g., the IPv6 identity of an "Internet of Things" 6LowPan light bulb or socket transceiver, plug unit, or the like), (2) RSSI (e.g., the signal strength/amplitude of the same nearby IPv6 RF transceiver) and (3) remote control (e.g., the ability to modulate that RF transceiver via the local network or internet). For example, a robot 200 can navigate a room (e.g. Zone A, Zone B, or Zone C) until it finds a peak signal strength of an IPv6 transceiver, in which case it can be expected to be nearest this transceiver. It can then tag this transceiver with a topological or Cartesian location. Should the transceiver be associated with a room identity by an end user or automatically via any means (e.g., living room light bulb No. 3), the robot 200 can use this information in various ways. For example, the robot 200 may be commanded to clean the living room, in which case it can use its mobility and distance-dependent variation in signal strength to home on this room (even without a map). As another example, a robot 200 can be commanded to clean only the living room, in which case one or more transceivers known to be in the living room to "anchor" the robot 200 to that room. (i.e., The robot 200 sets a threshold for signal strength and/or rough localization using multiple signal sources and/or identifiable walls and doorways, and covers the room such that the signal strength of the living room IPv6 6LowPAN light bulb is high.)

For example, the robot 200 may be executing a floor cleaning operation and the system 100 (e.g., via instructions from the hub 110 to the robot 200) may instruct the robot 200 to return to the dock 600, move to a different, unoccupied zone, avoid the occupied zone, or assume a quieter mode of operation. As another example, the controller 220 may monitor a charge on the battery 224 and may instruct the robot 200 to return to the dock 600 in order to recharge the battery 224 if the battery charge is lower than a predetermined threshold amount.

Although embodiments according to the invention are described with respect to the robotic management system 100, it should be understood that other configurations fall within the scope of the invention. For example, the operations of the hub 110 and the dock 600 may be combined into a single unit. Moreover, the controller 220 is illustrated as part of the robot 200; however, some or all of the operations of the controller 220 may be performed by the dock 600 or by other processors, such as the remote management servers 150, the local user terminal 142 and/or the remote user terminal 144.

Further methods and operations in accordance with embodiments of the invention, or in accordance with the invention, and utilizing the robotic management system 100 will now be described.

Pose Determination

As discussed above, the locations of the robot pose sensors 270A-B in the enclosure space 20 can be determined and registered so that the readings from the robot pose sensors 270A-B can be correspondingly registered with respect to the space 20. The camera 270B or other sensors on the robot 200 can be used to detect open doors 32. In this manner, the robot 200 can monitor portals to and zones of the enclosure space.

As shown in FIG. 5, the robot 200 can acquire data including observations of the fiducial markers 640A, 640B of the dock 600 in a field of view from two positions P1, P2. The robot memory 222 can store a spatial relationship of the fiducial markers 640A, 640B of the dock 600, which may be preloaded into the robot memory 222 based on the type or model of the dock 600 in use. The coordinates of the positions P1, P2 on a map may be calculated, for example, by the mapping and navigation system 240 as described herein. A normal or reference line (RL) may be established on the map to establish an angular reference θ for a pose of the dock 600. Optionally the angular reference θ of the pose is aligned with a docking lane, runway, path, entry way or approach vector of the dock 600 (in general, these terms mean that there is a preferred vector for physical entry into the dock 600 which permits mechanical and electrical features of the robot 200 to align with corresponding features of the dock 600 as the robot 200 engages along a substantially straight path). As illustrated, the reference line (RL) is an arbitrary reference that is defined on the map. However, the reference line (RL) may be defined with respect to the robot 200 or another defined position, including stationary positions on the map. When the sensors 270A-B observe the dock 600 and the fiducial markers 640A, 640B, the position of the robot 200 at the two positions P1, P2 may be combined with the known positions of the fiducial markers 640A, 640B in relation to the orientation of the dock 600 with respect to the reference line to determine a pose of the dock 600, for example, using triangulation or trilateralizing techniques as would be known to those of skill in the art.

Although as illustrated in FIG. 5, the robot 200 acquires data by moving the robot 200 to two different positions P1, P2, it should be understood that the sensors 270A-B may be positioned on the robot 200 so that information may be acquired from two or more spatially separate positions on the robot 200 simultaneously, such as with binocular vision. In addition, data may be acquired from two or more positions, or in some embodiments, or in the invention, the fiducial markers 640A, 640B may be configured to provide pose information from a single observation at a single position (e.g., if the fiducial markers are observed by a camera; the resultant image includes at least two fiducial markers 640A, 640B; each fiducial marker can be uniquely identified in the resultant image; and the relative relationship of the fiducial markers 640A, 640B with respect to one another and/or an additional reference plane is known to the robot 200). Moreover, the spatial relationship of the fiducial markers 640A, 640B may include a height and distance from one another as well as the geometric configuration of the dock 600. In some embodiments, or in the invention, estimating the pose of the dock 600 with respect to the current position of the robot 200 may require temporally distribution of sensor readings. For example, it may only be after the third time seeing the dock 600 with limited sensors that the robot 200 can estimate the pose of the dock 200 and mark it on its map (where the robot 200 thereafter has a constant estimation of its relative pose as it tracks itself on the same map, and can correct it every time it sees the dock 600 and gets a line of sight).

In some embodiments of the invention, such as the embodiment shown in FIG. 4E, the fiducial markers 640A, 640B may be LED lights that may be configured to indicate a beam direction and may be sensed on the dock 600 by one or more directional sensors. The data from the directional sensors may be combined with an analysis of the robot's current pose on a map that the mapping and navigation system 240 is building, for example using Simultaneous Localization and Mapping (SLAM) techniques. The robot memory 222 includes the spatial relationship of the LEDs, for example, that the lights are a certain distance from one another, the first light is a first distance from the floor and the second light is second distance from the floor, which may be different from the first distance from the floor. In particular embodiments, or in the invention, the lights may be distinguished from one another by having different characteristics, such as different frequencies, modulation or duty cycle.

The directional sensor can be a "binocular" sensor, such as twin photodiodes mounted in parallel light-limiting tubes, e.g., as described in U.S. Pat. No. 8,380,350, the disclosure of which is hereby incorporated by reference in its entirety. The controller 220 uses the direction of the tube of the binocular sensor combined with the robot's pose on the map created by the mapping and navigation system 240 to plot lines of sight to the dock 600 from different positions on the map in order to derive both the pose of the dock, including an X,Y location and an orientation.

In some embodiments, or in the invention, the fiducial markers 640A, 640B can be LED lights that are collimated and baffled to be a beam that is generally visible from only one direction, such that a multidirectional or directional sensor on the robot 200 can plot a line of sight once the robot 200 crosses the beam of the LED.

In some embodiments, or in the invention, the pose is derived by sensing both, or alternatively, visible light(s) and a visual pattern. For example, a distinctive visual pattern, bar code, photogrammetric target, APRIL or other tag is "anchored" by an LED light (i.e., the LED location is arranged at a known distance and/or orientation with respect to the tag(s)). The LED light can be identified by distinctive frequency or modulation if an analog sensor such as a photodiode or phototransistor is used; or can be identified by distinctive color, arrangement, pattern, or duty cycle if a frame-by-frame sensor such as a CMOS or CCD camera is used. The dock 600 may be powered with AC, so constant illumination, or at least during robot missions, is possible.

It should be understood that any combination of triangulation, trilateration, and angle of arrival can be used with directional beams and/or sensors if sufficient distances and/ or angles may be measured to render a solvable equation for a relative pose of the robot and dock.

Another exemplary set of fiducial markers 640A, 640B are part of a dock pattern, as shown in FIGS. 7 and 4D. As illustrated, the fiducial markers 640A, 640B may have sufficient spatial details so as to define an angular position of an object, in particular, when the fiducial marker 640A, 640B is applied to a three-dimensional object, such as the dock 600. In some embodiments, or in the invention, a fiducial marker pattern may balance the need for industrial design and aesthetics and a need for good recognition performance. The fiducial marker pattern may be distinctive so that false positives from background and clutter are minimized and the pattern may be sized to increase a likelihood of recognition and reduce false negatives.

In some embodiments, or in the invention, a dock pattern may be used that is not visible to the human eye to reduce a potentially negative impact on an industrial design and aesthetics. Image sensors commonly used for cameras may be sensitive to infrared (IR) light in addition to visible light. Thus, a fiducial marker may include a pattern that is covered, for example, with a film transparent in IR, but black in visible light so that the pattern may be captured with a camera using an IR compatible lens. The pattern may be therefore be designed to maximize visual distinctiveness without concern for aesthetics.

To increase the contrast to facilitate feature detection, the pattern may have portions that pass all IR light and portions that block IR light. The shapes in the pattern may vary and do not repeat to minimize confusion between the features. Different patterns may be used to potentially increase detection and recognition of a selected feature or cluster of features 640A, 640B. The pattern of the fiducial markers in FIG. 7, which includes portions that pass IR light and portions that block IR light, may be suited for DoG detectors and/or SIFT descriptors. As shown in FIG. 4D, the pattern may be placed on a three-dimensional surface, such as a cylinder so that the geometric constraints can be matched both visually and geometrically to reduce false positive matches and to visualize the pattern from a variety of directions.

In some embodiments, or in the invention, a database stores uniquely identifiable entries representing views of the fiducial markers 640A, 640B . . . 640n, where "n" is an integer indicating a maximum number of distinct fiducial markers, such that views of the unique clusters of features detectable in the pattern shown in FIG. 7 may be used to identify a pose of the dock 600. For example, a computer model may be used to provide model images at various spatial positions from the dock 600. A sensor output, such as actual images of the dock 600, may then be compared to the model images to estimate a spatial relationship between the dock 600 and the robot 200 to determine the dock pose.

For example, in some embodiments, or in the invention, as illustrated in FIG. 8, the memory 222 includes a three-dimensional model of the dock 600, such as a CAD model (Block 400). The CAD model may be a model that is used to fabricate the dock 600 or it may be based on images of a pre-fabricated physical dock 600. The three-dimensional model can be used to model synthetic images of the dock 600 that are taken from a set of viewpoints to determine the positions and descriptors for each of the features of the fiducial markers 640A, 640B. The three-dimensional positions and descriptors for each feature are stored in the memory 222 and can be used to determine the position of the robot 200. Accordingly, the three-dimensional model of the dock 600 can be used to generate modeled data based on known positions and orientations with respect to the three-dimensional model. The data can be compared to actual sensor data from the robot 200 at an unknown position, and the position of the robot 200 can be determined based on a match or approximate match between the actual sensor data and the modeled data.

For example, the model can be calculated as follows. The three-dimensional model with one or more fiducial markers 640A, 640B, such as a visual pattern, can be determined. A set of viewpoints are selected (Block 402), and for each of the viewpoints (Block 404) images of the three-dimensional model are rendered (Block 406).

For a particular viewpoint, the three-dimensional model can be rendered with selected image effects, such as noise, lighting effects, color, blur and/or distortion (Block 406). Each feature in the rendered image has an associated center in image coordinates, orientation and scale. These features and their descriptors (coordinates, orientation, scale, etc.) can be detected and identified in the viewpoint (Block 408). For each keypoint in the image (Block 410), each feature can be projected onto the surface of the three-dimensional image using a particular camera model and three-dimensional geometry (Block 412). Any features whose centers do not intersect the three-dimensional model surface may be removed (Blocks 414 and 416), and an image support region for each feature remaining is calculated using the orientation and the scale of the feature (Block 415). If a feature has a support region that crosses the occluding boundary of the three-dimensional model in the rendered image (Block 418), it is removed. The feature descriptors for each feature that is remaining is calculated (Block 420), and the three-dimensional positions and descriptors for each of the features is stored (Block 422). The above steps are repeated for each viewpoint (Block 424 and 426).

In some embodiments, or in the invention, many feature detections across disparate views may arise from the same three-dimensional location on the model with only slight differences in position due to artifacts of feature detection. These duplicate detections may be combined to curb the growth of the final model for optimizing storage size, run-time, matching speed, and final pose accuracy. The dimensional spatial clustering of model points and histogram-space clustering of feature descriptors may be used to combine these duplicate detections to make the image model more compact.

Accordingly, a database containing visual descriptors of features of the fiducial markers 640A, 640B, such as a visual dock pattern on the dock 600, can be created. Any suitable visual descriptor can be used, such as the Scale Invariant Feature Transform (SIFT), Speeded Up Robust Features (SURF), Binary Robust Independent Elementary Features (BRIEF) or others known to those of skill in the art. The database may also include information about which direction a feature is viewable from. For example, the surface normal at the feature point can be stored and used as a visibility constraint.

As shown in FIG. 9, the controller 220 can receive a signal from the sensors 270A-B, such as a target image (Block 500), and then detects visual features from the actual image using a feature detector, such as a Difference of Gaussians (DoG), Harris Corners, Maximally Stable Extremal Regions (MSER), FAST or other techniques known to those of skill in the art (Block 502). The feature detector used on an actual image can then look up features that have been calculated in the model (Block 504) and match the feature to a modeled feature (Blocks 506-526). A descriptor can be extracted for each actually detected feature, and appearance matches can be determined by looking up feature descriptors in the database of dock "landmark" features described above. In some embodiments, or in the invention, to increase a chance of finding a set of features that match the fiducial markers 640A, 640B, clusters may be formed from image-to-database feature matches that are spatially close in the image plane of the target image (Block 506). For each cluster (Block 508), a Random Sample Consensus (RANSAC) or Progressive Sample Consensus (PROSAC) process can be used to find a hypothetical pose of the camera relative to the fiducial markers 640A, 640B (Block 510). For example, if an inlier threshold is passed that indicates that the image data may be explained by a set of model parameters (Block 512), then the pose and inlier is computed with all image matches (Block 516), the result is stored (Block 518), and additional clusters are analyzed (Block 520). If an inlier threshold is not met (Block 512), then the remaining clusters are analyzed (Block 514). The sampling process can use constraints such as requiring a candidate set of matches to be viewable from the same direction to increase the chances of success and may take advantage of the three-dimensional information of the dock fiducial markers 640A, 640B. Within each cluster, if a hypothetical pose is found, it can be refined using bundle adjustment, and the pose can be re-optimized using all image matches (i.e., not only those in the cluster). Each cluster may be scored by the number of inlier matches, and the best cluster can be selected. If a cluster passes a threshold matching score (Block 522), the recognition is determined to be successful, and the estimated pose and covariance is given to the controller 220 for maneuvering into the docking station 600 (Block 524).

Although embodiments according to the invention are described with respect to sensors 270A-B on the robot 200 and fiducial markers 640A, 640B on the dock 600, it should be understood that in some embodiments, or in the invention, the sensors 270A-B may be positioned on the dock 600, and the fiducial markers 640A, 640B can be positioned on the robot 200. Thus, the dock 600 may be configured to communicate sensor data, calculate a docking path 180, and or communicate instructions to the motorized drive system 230 based on the signal output of sensors on the dock 600. For example, the dock 600 can include a directional or non-directional sensor, and the robot 200 can include a fiducial marker, such as an LED or LED beam, and the dock 600 can notify the robot 200 when the robot's fiducial markers are detected by the sensors on the dock 600. Moreover, various components of the robot 200, such as the controller 220, the memory 222, the HMI 228, and the mapping and navigation system 240 may be included on the dock 600 and/or the hub 110 such that the output of the functions of such components may be communicated to the robot 200.

Docking Path Calculation

Tuning now to path planning a docking path 180 between the robot 200 moving in a forward direction F toward the docking lane 650 and docking port 660 of the dock, FIGS. 4A-4C schematically demonstrate direct path planning using a curve fit 180 to the docking lane 650 (FIGS. 4A and 4B) and contrasting segmented approach 180a, 180b, 180c (FIG. 4C). Because the robot 200 is able to determine the pose of the dock 600 relative to the robot 200 and, in embodiments, or in the invention, determine the location of the dock 600 on a map created by the robot 200 or stored therein, the robot 200 may pre-plan the most direct and unobstructed path to the dock 600 when the time comes for recharging and/or evacuating debris (FIG. 4C). As indicated in the embodiments of the dock 600 in FIGS. 4D and 4E, the dock 600 includes a docking lane 650 into which a robot 200 moves in a forward direction F upon approach. In embodiments, or in the invention, the docking lane 650 is bounded by outside edges 650a, 650b and has a central axis 650c aligned with the central axis of the docking port 660 into which the robot 200 drives. By approaching the dock 600 within the outside bounds 650a, 650b of the docking lane 650, the robot 200 guarantees proper alignment of its contacts with the docking contacts 622A, 622B, proper alignment of its wheels with the dock detents 620A, 620B and/or proper alignment of the robot air path with the evacuation adapter 610 of the dock 600.

As FIGS. 4A and 4B indicate, when the robot 200 builds a map of the space as described herein and stores a pose of the dock pose (X, Y position and orientation) on the map and knows the dock pose relative to the robot 200, a docking path 180 of the robot 200 to the dock 600 may be mapped along a curve fit to the docking lane without any realignment steps. The pose of the dock 600, for purposes of explanation, is the same as the X,Y location and orientation of the central axis 650c of the docking lane 650 relative to a global map. With this information, the robot 200 can maneuver to reach the docking lane 650 quickly and with increased chance of success as compared to a segmented docking route 180a, 180b, 180c in which the pose of the dock 600 is not stored but rather determined in real time while the robot 200 is returning to the dock 600 (FIG. 4B).

In FIG. 4B, the robot 200 has not stored a pose of the dock 200 and returns to the dock 600 in stages of travel. The homing 180a stage allows the robot to find a signal identifying the location of the dock 600. The robot 200 turns in place 182a to move along an alignment stage 180b and then turns in place 182b again to align with detected signals such that the robot 200 approaches the dock 600 along the docking lane 650. In contrast, as shown in FIG. 4C, for example, by path planning to the dock 600 having a pose already known to the robot 200, the robot 200 plots a course eliminating the time associated with homing 180a, aligning 180b, and repositioning (e.g. turning in place 182a,182b, zigzagging, overshooting, etc.) to achieve proper alignment 180c with a docking lane 650 of the dock 600. Aligning with the docking lane 650 enables the robot 200 to mate successfully with the aforementioned evacuation collar 610, detents 620A, 620B and/or electrical contacts 622A, 622B, or simply to align with the docking port 660. Path planning to the dock 600 (FIG. 4C) therefore is a faster and more successful approach than docking without path planning (FIG. 4B).

In embodiments of path planning, or in the invention, homing, alignment and approach phases are path planned directly into a curve fit path 180 to the dock 600, which may be a bayesian curve, for example. The curve fit path 180 may reduce or eliminate a need to improve alignment of the robot 200 to the dock pose (e.g. angle of the docking lane 650 relative to map coordinates). Path planning also may take into account whether obstacles (e.g. chair legs, ottomans, couches, etc.) are disposed between the robot 200 and the docking lane 650 such that the curve fit 180 avoids collisions with such obstacles that would otherwise impede (e.g. slow) the docking process.

Should a user or constraint algorithm so specify, a series of points on the floor may permit the robot 200 to complete a Bezier curve among these points, avoiding obstacles and/or passing through doorways or corridors parallel to their walls (i.e. parallel to the walls of a corridor and/or down the middle of the corridor, perpendicular to the lentil of a doorway 32 and/or through the middle of the doorway 32). A Bezier curve may permit a graceful path 180 composed of smooth splines without stops or turning in place 182*a*, 182*b*; if obstacles are detected along the path, the path finding algorithms discussed above may add waypoints as necessary.

The robot 200 may favor a path that avoids known obstacles, passes through unoccupied floor space, and matches the docking lane 650. The path 180 may be plotted via path finding algorithms such as variations upon Dijkstra's algorithm (e.g., the A* algorithm or D* family of algorithms, e.g., D*, Field D*, IDA*, Fringe, Fringe Saving A*, Generalized Adaptive A*, Lifelong Planning A*, Simplified Memory bounded A*, and/or Theta*). A revised A* algorithm for non-holonomic drives may be used, as defined in Pinter M. (2001) "Toward More Realistic Pathfinding", Game Developer Magazine (April), CMP Media LLC, pp. 54-64, which is herein incorporated by reference in its entirety. The potential path tree is resorted per the algorithm.

Pathfinding may optionally include pre-processing such as contraction hierarchies, or as discussed in Delling, D. et al. (2009). "Engineering route planning algorithms". Algorithmics of large and complex networks. Springer. pp, 117-139, which is herein incorporated by reference in its entirety.

In general, the curve fitting, path finding and/or pre-processing algorithm employed may be constrained such that the path solution(s) or curves 180 fitted include the docking lane 650; a portion of the docking lane 650 equal to or greater than one robot length L from the footprint of the dock 600; a set of possible entry curves 180 and/or entry splines aligned in part with the docking lane 650; and/or two or three points along the docking lane 650.

In some embodiments, or in the invention, the robot 200 takes new images of the dock 600 and processes it as described above with respect to the database of modeled images to determine real or near-real time coordinates of the robot 200 with respect to the pose of the dock 600. For each processed image, the output may be a three-dimensional position and orientation of the robot 200 with respect to the dock 600. Before making a maneuvering decision based on the computed three-dimensional position and orientation, the robot 200 first checks whether the three-dimensional position and orientation falls into an expected three-dimensional space of positions and orientations.

In some embodiments, or in the invention, the roll and pitch of the three-dimensional orientation may be close to a nominal roll and pitch angle of the robot moving on a horizontal flat surface. In addition, the z-coordinate may be close to a nominal height of the robot 200 being in contact with a horizontal and flat ground floor. If any one of the roll, pitch, or z-coordinate falls outside of the expected nominal range, then the three-dimensional position and orientation is rejected and the robot 200 waits for a new image from the camera. This verification of three-dimensional position and orientation may ensure that the robot 200 rejects observations that are not plausible given the orientation of the robot driving on a horizontal and flat floor.

Once a plausible three-dimensional position and orientation has been obtained, it is projected onto the two-dimensional plane by discarding roll, pitch and z-coordinates, so that a two-dimensional position and orientation including the x- and y-coordinates and the yaw angel is obtained.

Further features, advantages and details of the present invention will be appreciated by those of ordinary skill in the art from a reading of the figures and the detailed description of the preferred embodiments that follow, such description being merely illustrative of the present invention.

That which is claimed is:

1. A mobile robot system comprising:
    a docking station including at least two pose-defining fiducial markers, the at least two pose-defining fiducial markers having a predetermined spatial relationship with respect to one another and/or to a reference point on the docking station such that a docking path to the base station can be determined from one or more observations of the at least two pose-defining fiducial markers;
    a mobile robot including:
        a chassis,
        a motorized drive connected to the chassis for moving the mobile robot to a docked position, and
        a pose sensor assembly comprising a sensor configured to output a signal in response to the at least two pose-defining fiducial markers in a pose sensor field of view;
    a controller configured to analyze the output signal from the pose sensor assembly, the controller having the predetermined spatial relationship of the at least two pose-defining fiducial markers stored in a controller memory,
    wherein the controller is configured to determine a docking station pose that is based on the spatial relationship of the pose-defining fiducial markers and the signals from the pose sensor assembly, and to locate the docking station pose on a map of a surface traversed by the mobile robot, wherein the docking station pose comprises a position defined by location coordinates on the map and an angular orientation of the docking station on the map, and the docking station pose defines a docking lane on the map comprising outside edges and a central axis that is aligned with a central axis of the docking port, and the controller is configured to store the pose of the docking station on the map of the surface traversed by the mobile robot; and
    the controller is further configured to path plan a docking trajectory including a curve having a terminal portion aligned with the central axis of the docking lane of the docking station, based on a current robot position on the map of the surface and the docking station pose including the outside edges and the central axis of the docking lane and to provide instructions to the motorized drive to move the mobile robot along the curve of the docking trajectory and into a docking lane within the outside edges and along the central axis of the docking lane of the docking station.

2. The system of claim 1, wherein the controller is located on the chassis of the mobile robot.

3. The system of claim 1, further comprising a database of image data with respect to a plurality of viewpoints of the docking station, wherein the controller is configured to compare the output signal from the pose sensor assembly with the database of image data, and to estimate a pose of the docking station responsive to a comparison of the output signal from the pose sensor assembly with the database of image data.

4. The system of claim 3, wherein the database of image data is generated from a three-dimensional computer model of the docking station and the fiducial markers thereon.

5. The system of claim 4, wherein the controller is configured to path plan a docking trajectory by moving the robot toward the docking lane in response to a current position of the robot and the pose of the docking station.

6. The system of claim 5, wherein the controller is configured to move the robot towards a charging port and/or receptacle of the docking station if the robot is sufficiently close to a predetermined position, and to monitor when the robot connects to the charging port and/or receptacle.

7. The system of claim 3, wherein the controller is configured to path plan a docking trajectory by acquiring images of the docking station, determining the pose of the docking station with respect to the robot, including the position defined by location coordinates on the map and the angular orientation of the docking station, based on the images, and maneuvering the robot in response to the pose of the docking station with respect to the robot.

8. The system of claim 1, wherein the controller determines the pose of the docking station by acquiring data including observations of the fiducial markers of the docking station from at least two positions of the robot and triangulating a location and angular orientation of the docking station in response to the data.

9. The system of claim 8, wherein the fiducial markers are LEDs that are configured indicate a beam direction to the pose sensor assembly.

10. The system of claim 9, wherein the LEDs have different light-emitting characteristics such that the pose sensor assembly is configured to identify an orientation of the LEDs responsive to the predetermined spatial relationship of the LEDs.

11. The system of claim 10, wherein the pose sensor assembly comprises a directional sensor.

12. The system of claim 11, wherein the directional sensor comprises twin photodiodes.

13. The system of claim 11, wherein the fiducial markers are collimated and/or baffled LED lights that generally emit light in a direction such that the pose sensor assembly is configured to plot a line of sight when the robot crosses the emitted light.

14. The system of claim 11, wherein the fiducial markers comprise a portion that transmits IR light and a portion that blocks IR light.

15. A computer program product for determining a docking path, the computer program product comprising a non-transitory computer readable storage medium having computer readable code embodied in the medium, the computer code comprising:
computer readable code configured to
analyze an output signal from a pose sensor assembly on a mobile robot, wherein the output signal is responsive to an observation by the pose sensor assembly of at least two fiducial markers on a docking station,
determine a docking station pose that is based on a predetermined spatial relationship of the pose-defining fiducial markers and the signals from the pose sensor assembly,
locate a docking station pose on a map of a surface traversed by the mobile robot, wherein the docking station pose comprises a position defined by location coordinates on the map and an angular orientation of the docking station, the docking station pose defining a docking lane on the map comprising outside edges and a central axis that is aligned with a central axis of the docking port, and the controller is configured to store the pose of the docking station on the map of the surface traversed by the mobile robot; and
path plan a docking trajectory including a curve having a terminal portion aligned with the central axis of the docking lane of the docking station, based on a current robot position on the map of the surface and the docking station pose including the outside edges and the central axis of the docking lane and to provide instructions to the motorized drive to move the mobile robot along the curve of the docking trajectory and into a docking lane within the outside edges and along the central axis of the docking lane the docking station.

16. The computer program product of claim 15, wherein the computer readable code is configured to receive a database of image data with respect to a plurality of viewpoints of the docking station, to compare the output signal from the pose sensor assembly with the database of image data, to estimate a pose of the docking station responsive to a comparison of the output signal from the pose sensor assembly with the database of image data, and to store the pose of the docking station on the map of the surface traversed by the mobile robot.

17. The computer program product of claim 16, wherein the database of image data is generated from a three-dimensional computer model of the docking station and the fiducial markers thereon.

18. The computer program product of claim 17, wherein the computer readable program code is configured to path plan a docking trajectory by moving the robot toward a predetermined position in front of the docking station in response to a current position of the robot and the pose of the docking station.

19. The computer program product of claim 14, wherein the computer readable program code is configured to determine the pose of the docking station by acquiring data including observations of the fiducial markers of the docking station from at least two positions of the robot and triangulating a location and angular orientation of the docking station in response to the data.

20. A method for determining a docking path, method comprising:
analyzing an output signal from the pose sensor assembly on a mobile robot, wherein the output signal is responsive to an observation by the pose sensor assembly of at least two fiducial markers on a docking station,
determining a docking station pose that is based on a predetermined spatial relationship of the pose-defining fiducial markers and the signals from the pose sensor assembly,
locating a docking station pose on a map of a surface traversed by the mobile robot, wherein the docking station pose comprises a position defined by location coordinates on the map and an angular orientation of the docking station, and the docking station pose defines a docking lane on the map comprising outside edges and a central axis that is aligned with a central axis of the docking port, and the controller is configured to store the pose of the docking station on the map of the surface traversed by the mobile robot; and
path planning a docking trajectory including a curve having a terminal portion aligned with the central axis of the docking lane of the docking station, based on a current robot position on the map of the surface and the docking station pose including the outside edges and the central axis of the docking lane and to provide instructions to the motorized drive to move the mobile robot along the curve of the docking trajectory and into a docking lane within the outside edges and along the central axis of the docking lane of the docking station.

* * * * *